US010385506B2

(12) United States Patent
Pettersson et al.

(10) Patent No.: US 10,385,506 B2
(45) Date of Patent: Aug. 20, 2019

(54) ARRANGEMENT AND SYSTEM FOR FEEDING BIOMASS MATERIAL TO A TREATMENT PROCESS

(71) Applicant: VALMET AB, Sundsvall (SE)

(72) Inventors: Patrik Pettersson, Alnö (SE); Johan Carlsson, Alnö (SE)

(73) Assignee: VALMET AB, Sundsvall (SE)

(*) Notice: Subject to any disclaimer, the term of this patent is extended or adjusted under 35 U.S.C. 154(b) by 184 days.

(21) Appl. No.: 15/528,045

(22) PCT Filed: Dec. 22, 2015

(86) PCT No.: PCT/SE2015/051392
§ 371 (c)(1),
(2) Date: May 18, 2017

(87) PCT Pub. No.: WO2016/105270
PCT Pub. Date: Jun. 30, 2016

(65) Prior Publication Data
US 2017/0314198 A1 Nov. 2, 2017

(30) Foreign Application Priority Data

Dec. 22, 2014 (SE) .................................... 1451638

(51) Int. Cl.
D21C 7/06 (2006.01)
B01J 8/00 (2006.01)
(Continued)

(52) U.S. Cl.
CPC .............. *D21C 7/06* (2013.01); *B01J 8/0015* (2013.01); *B01J 8/0045* (2013.01);
(Continued)

(58) Field of Classification Search
CPC ... B01J 8/0015; B01J 8/0045; B02C 18/2266; D21C 7/06
See application file for complete search history.

(56) References Cited

U.S. PATENT DOCUMENTS 2,523,642 A 9/1950 Becker
8,604,259 B2 * 12/2013 Noto ...................... C10B 47/32
201/21
2009/0221814 A1 9/2009 Pschorn et al.

FOREIGN PATENT DOCUMENTS

FR 2 362 668 A1 3/1978
SU 914670 3/1982
(Continued)

OTHER PUBLICATIONS

Damartzis, T. and A. Zabaniotou, "Thermochemical conversion of biomass to second generation biofuels through integrated process design—A review", Renewable and Sustainable Energy Reviews, pp. 366-378 (Year: 2011).*
(Continued)

Primary Examiner — Renee Robinson
(74) Attorney, Agent, or Firm — Birch, Stewart, Kolasch & Birch, LLP

(57) ABSTRACT

A feeding arrangement for feeding lignocellulosic biomass material such as annual plant material towards a hydrolysis process includes at least one transportation device for transporting the biomass material towards the treatment process; and at least one tearing roll arranged at a predetermined distance from the at least one transportation device and being provided with tearing protrusion. The at least one tearing roll is arranged with a predetermined distance to the at least one transportation device to tear off parts of the transported material to provide a substantially continuous flow of material.

5 Claims, 7 Drawing Sheets

(51) Int. Cl.
*B02C 18/22* (2006.01)
*B02C 23/02* (2006.01)
*D01G 23/00* (2006.01)

(52) U.S. Cl.
CPC ...... *B02C 18/2216* (2013.01); *B02C 18/2266* (2013.01); *B02C 18/2283* (2013.01); *B02C 23/02* (2013.01); *D01G 23/00* (2013.01); *Y02E 50/16* (2013.01)

(56) References Cited

FOREIGN PATENT DOCUMENTS

| | | |
|---|---|---|
| SU | 1388481 A2 | 4/1988 |
| WO | WO 90/02223 A1 | 3/1990 |
| WO | WO 97/39177 A1 | 10/1997 |
| WO | WO 2013/126007 A1 | 8/2013 |

OTHER PUBLICATIONS

International Search Report for PCT/SE2015/051392 (PCT/ISA/210) dated Feb. 24, 2016.
Written Opinion of the International Searching Authority for PCT/SE2015/051392 (PCT/ISA/237) dated Feb. 24, 2016.

* cited by examiner

ARRANGEMENT AND SYSTEM FOR FEEDING BIOMASS MATERIAL TO A TREATMENT PROCESS

TECHNICAL FIELD

The present invention relates to feeding arrangements and systems for hydrolysis and pre-hydrolysis processes using ligno-cellulosic biomass material including biomass material such as annual plants.

BACKGROUND OF THE INVENTION

High pressure or pressurized systems are typical in hydrolysis and pre-hydrolysis processes. Feeding of cellulosic biomass material including annual plants to be treated in a treatment arrangement, for example, an arrangement for a pre-hydrolysis process therefore often involves handling of the material under higher pressures. In such arrangements it is important to provide a smooth and reliable feeding of the biomass material in order to prevent and avoid, for example, uneven power consumption and problems with so called blow-back flow.

According to prior art solutions, biomass material is transported to the treatment process via a feeding arrangement such as a pin drum feeder and further to a conveying device which conveys the material to the treatment process.

In typical prior art feeding arrangements, a housing is arranged with an upper inlet opening for receiving the material and a lower outlet opening 15 for discharging the material to conveyor. Revolving drums are provided in the housing to control the transport and flow rate of the material through the housing. After the material has passed the revolving drums, the material falls through the lower outlet opening to the plug screw feeder. It is important to maintain a smooth and continuous flow of material into the treatment process. This is crucial in pressurized systems. An example of a process in a pressurized system is a pre-hydrolysis process. Such processes are sensitive to changes in the flow rate. The material is fed to the pin drum feeder from a vertical feeding chute or similar unit connected to the upper inlet opening of the housing. An effective and smooth average flow of material into the pin drum feeder requires that this vertical feeding pipe is completely filled with material during operation. Hence, when the feeding pipe is completely filled with material, the flow into the pin drum feeder will be smooth and continuous. The revolving drums operate to feed the material through the housing towards the outlet opening in a controlled manner. During the rotation of the drums material is forced through the housing and leaves the drums when the weight of the material exceeds the binding strength of the material.

However, if the binding strength of the material increases, which may occur when the material is compressed, it may result in that the material is stuck to the drums and leave the drums in blocks instead of a smooth stream of material. This results in a discontinuous feeding of material to the conveying device which, in turn, entails varying power consumption and feeding disruptions within the conveying device.

Thus, there is a need for improved feeding arrangements for feeding lignocellulosic biomass material such as annual plants to a treatment process and an improved system comprising such a feeding arrangement and a method for feeding lignocellulosic biomass material such as annual plants to a treatment process.

SUMMARY OF THE INVENTION

An object of the present invention is to provide improved pressurized feeding arrangements and systems for hydrolysis and pre-hydrolysis processes using lignocellulosic biomass material such as annual plants.

Another object of the present invention is to provide improved pressurized feeding arrangements and systems for hydrolysis and pre-hydrolysis processes of lignocellulosic biomass material, such as annual plants, having a low density.

A further object of the present invention is to provide improved pressurized feeding arrangements and systems for smoothly and continuously feeding lignocellulosic biomass material, such as annual plants, with a high degree of precision to a subsequent hydrolysis process.

In the context of the present invention, the term "plug screw feeder" relates to a feeder comprising a screw or similar rotating means and which is capable of feeding or transporting lignocellulosic material through the feeder at increased or maintained density of the material and that creates an essentially gas- and fluid-tight plug of the lignocellulosic material towards the end of the feeder. For example, according to an embodiment of such a plug screw feeder, a cross-sectional area of the circular housing of the feeder and the screw diameter decreases in the feeding direction thereby so as to create a decreasing space between the screw and the housing and thus resulting in an essentially gas- and fluid-tight plug of the lignocellulosic material towards the end of the feeder. According to another embodiment of a plug screw feeder, the cross-sectional area of the circular housing of the feeder is constant while and the screw diameter and screw axis increases in the feeding direction thereby creating a decreasing space between the screw and the housing and thus resulting in an essentially gas- and fluid-tight plug of the lignocellulosic material towards the end of the feeder. As the skilled person realizes, there are other embodiments of feeders that achieves this purpose and thus are included within the definition of the term "plug screw feeder".

Further, a force-feeding screw that may be used in the present invention is described in, for example, WO 2013126007.

According to an aspect of the present invention, there is provided a feeding arrangement for feeding lignocellulosic biomass material such as annual plant material to or towards a hydrolysis or pre-hydrolysis process. The feeding arrangement comprises at least one transportation device for transporting the biomass material towards the hydrolysis or pre-hydrolysis process and at least one tearing roll arranged at a predetermined distance from the at least one transportation device. The tearing roll is provided with tearing protrusions and is arranged with a predetermined distance to the at least one transportation device to tear off parts of the transported material to provide a substantially continuous average flow rate of material.

According to another aspect of the present invention, there is provided a feeding system for feeding lignocellulosic biomass material such as annual plant material to or towards a hydrolysis or pre-hydrolysis process. The system comprises a feeding arrangement including at least one transportation device for transporting the lignocellulosic biomass material such as annual plant material towards the hydrolysis or pre-hydrolysis process and at least one tearing roll arranged in connection to the at least one transportation device. The tearing roll is provided with tearing protrusions and is arranged with a predetermined distance to the at least one transportation device to tear off parts of the transported material to provide a substantially continuous average flow rate of material. A force-feeding screw is coupled to the feeding arrangement to receive biomass material discharged from the outlet opening of the feeding arrangement, wherein the force-feeding screw is arranged to transport the biomass material to or towards the hydrolysis or pre-hydrolysis process.

The present invention is based on the insight that by arranging a revolving tearing roll or grinding roll adjacent to the transportation device at a predetermined distance from the transportation device it is possible to restrain the block-wise feeding of material to the subsequent process, for example, a force-feeding screw and/or the plug screw feeder, which often occurs. The tearing roll effectively prevents the material blocks from forming and instead disintegrates the material to deliver a smooth and continuous stream of material towards the force-feeding screw and/or the plug screw feeder.

According to embodiments of the present invention, a speed of the transportation device is controlled by a first motor having a variable speed, wherein a rotation of the at least one tearing roll is controlled by a second motor having a variable speed and wherein the speed of the at least one tearing roll is variable independently of the speed of the transportation device.

In embodiments where the present invention is implemented in a system including a conveyer belt, the invention is based on the insight that by arranging the revolving tearing or grinding roll adjacent to the discharge end of the conveyer belt and/or above the transportation side of the conveyer belt it is possible to restrain the block-wise feeding of material to the subsequent process, for example, a force-feeding screw and/or the plug screw feeder, which often occurs. The tearing roll or rolls effectively prevents the material blocks from forming and instead disintegrates the material to deliver a smooth and continuous stream of material towards, for example, a force-feeding screw and/or a plug screw feeder.

In embodiments where the present invention is implemented in a system including drum feeder, the invention is based on the insight that by arranging the revolving tearing or grinding roll below the revolving drums and above the outlet opening, it is possible to restrain the block-wise feeding of material to the force-feeding screw and/or the plug screw feeder which often occurs. The tearing roll effectively prevents the material blocks from forming on the drums and instead disintegrates the material that is collected on the drums to deliver a smooth and continuous stream of material towards, for example, a force-feeding screw and/or a plug screw feeder.

In preferred embodiments of the present invention, the feeding arrangement is utilized in connection with pressurized treatment processes posing special requirements on its feeding arrangement. By the term pressurized is meant that the pressure in the treatment process exceeds atmospheric pressure. When feeding lignocellulosic biomass material such as annual plant material to a pressurized treatment process, the feeding arrangement must be adapted in such a way that a back flow of high-pressure material or high-pressure steam from the treatment process is avoided or at least minimized. In such application it is of outermost importance that the material in the plug screw feeder is fully compressed and is constantly feed in a smooth stream to the plug screw feeder to minimize the risk of high-pressure material or steam going in the wrong direction, i.e. backwards in relation to the feeding direction of the biomass material. The present invention provides a smooth and continuous feeding of material, with a high degree of precision, to the force-feeding screw and/or the plug screw feeder, thereby allowing the material in the plug screw feeder to be fully compressed during operation.

According to embodiments of the present invention, the drums of the feeding arrangement are arranged to co-rotate with respect to each other and thereby transporting the material downwards. In embodiments, the first and second drum is adapted to able to be rotated at variable speed in relation to a production flow rate.

According to embodiments of the present invention, the tearing roll is adapted to able to be rotated at variable speed in relation to a production flow rate. The speed of the tearing roll and the speeds of the drums are variable independently of each other.

According to embodiments of the present invention, a force-feeding screw such as plug screw feeder is arranged essentially perpendicular to the feeding arrangement, e.g. a pin drum feeder, meaning that their respective feeding direction are essentially perpendicular to each other. In one embodiment of the present invention, the pin drum feeder is arranged to feed material to the plug screw feeder from above, i.e. a transverse feed into the plug screw feeder in relation to its feeding direction.

According to embodiments of the present invention, the plug screw feeder is adapted to able to be rotated at variable speed in relation to a production flow rate set by the feeding arrangement. In other embodiments, the plug screw feeder is adapted to be kept at a constant speed being chosen such that the plug screw feeder has a predetermined degree of filing below the production flow rate set by the feeding arrangement.

According to embodiments of the present invention, the tearing roll is arranged such that an outer part of a tearing protrusion is at a first predetermined distance from an outer surface of the first drum and at a second predetermined distance from an outer surface of the second drum. Protruding pins are according to embodiments provided on the outer surfaces of the first and second drums. In embodiments, the first distance and second distance are equal to or lower than a radius and of the first and second drum, respectively, and, preferably equal to or lower than half the radius of the first and second drum, respectively. Further, a minimum distance between a tip of a pin of a drum and the outer part of the tearing roll is preferably 1 cm.

According to embodiments of the present invention, the radius of the tearing roll is smaller than the radius of the first drum and the radius of the second drum. The radius of the tearing roll is defined as the radius of the roll itself (without the tearing protrusions), and the radius of the first drum and the radius of the second drum are defined as the radius of the first/second drums themselves (without any protruding pins). In other embodiments, the radius of the tearing roll may be defined to the outer ends or parts of the tearing protrusions, and the radius of the first drum and the radius of the second drum may be defined to the outer ends of the protruding pins. In both cases, the radius of the tearing roll is smaller than the radiuses of the first and second drums. This is advantageous since it allows the tearing roll to be placed close to the first and second drums to effectively tear off parts of the transported material to provide a substantially continuous average flow rate of material.

According to embodiments of the present invention, the transportation device is a conveyer belt. In embodiments, two tearing rolls are provided, wherein a first tearing roll is arranged above a transportation side of the conveyer belt to tear off parts of the transported material and a second tearing roll is arranged at a discharge end of the conveyer belt to tear off parts of material being discharged from the conveyer belt. In embodiments, the rotation of the at least one tearing roll is controlled by a motor having a variable speed and wherein the speed of the at least one tearing roll is variable independently of a transport speed of the transportation device.

According to embodiments of the present invention, an outer part of the first tearing roll, which is arranged at a discharge end of the conveyer belt, is arranged at predetermined distance from the discharge end of the conveyer belt, wherein the distance is within a range relative the thickness or height of the layer or mat of biomass material transported on the conveyor belt. Preferably, the range is between 0.5× the height of the layer of the transported material and 1.5× the height of the layer transported material, or at least 50 mm.

According to embodiments of the present invention, an outer part of the second tearing roll, which is arranged above the transportation side of the conveyer belt, is arranged at predetermined distance from the conveyer belt, wherein the distance is within a range relative the thickness or height of the layer or mat of biomass material transported on the conveyor belt. Preferably the range is between 0.5× the height of the layer of the transported material and 1.5× the height of the layer transported material, or at least 50 mm Further advantageous embodiments of the device according to the present invention and further advantages with the present invention emerge from the detailed description of embodiments.

In the above, an arrangement and a system for feeding lignocellulosic biomass material towards a hydrolysis or pre-hydrolysis process have been described. It is understood from this wording that the arrangement and system are suitable for feeding biomass material towards a hydrolysis or pre-hydrolysis process, i.e. in the direction of such a process, but not necessarily directly to the process. Thus, the biomass material may be fed to a pre-hydrolysis process, the hydrolysis process/reactor itself, or even another process downstream of the hydrolysis process/reactor.

BRIEF DESCRIPTION OF THE DRAWINGS

The present invention will now be described, for exemplary purposes, in more detail by way of embodiments and with reference to the enclosed drawings, in which:

FIG. 8b is a cross-sectional view of the embodiment of the tearing roll shown in FIG. 8a.

DETAILED DESCRIPTION OF PREFERRED EMBODIMENTS

Figure 1:
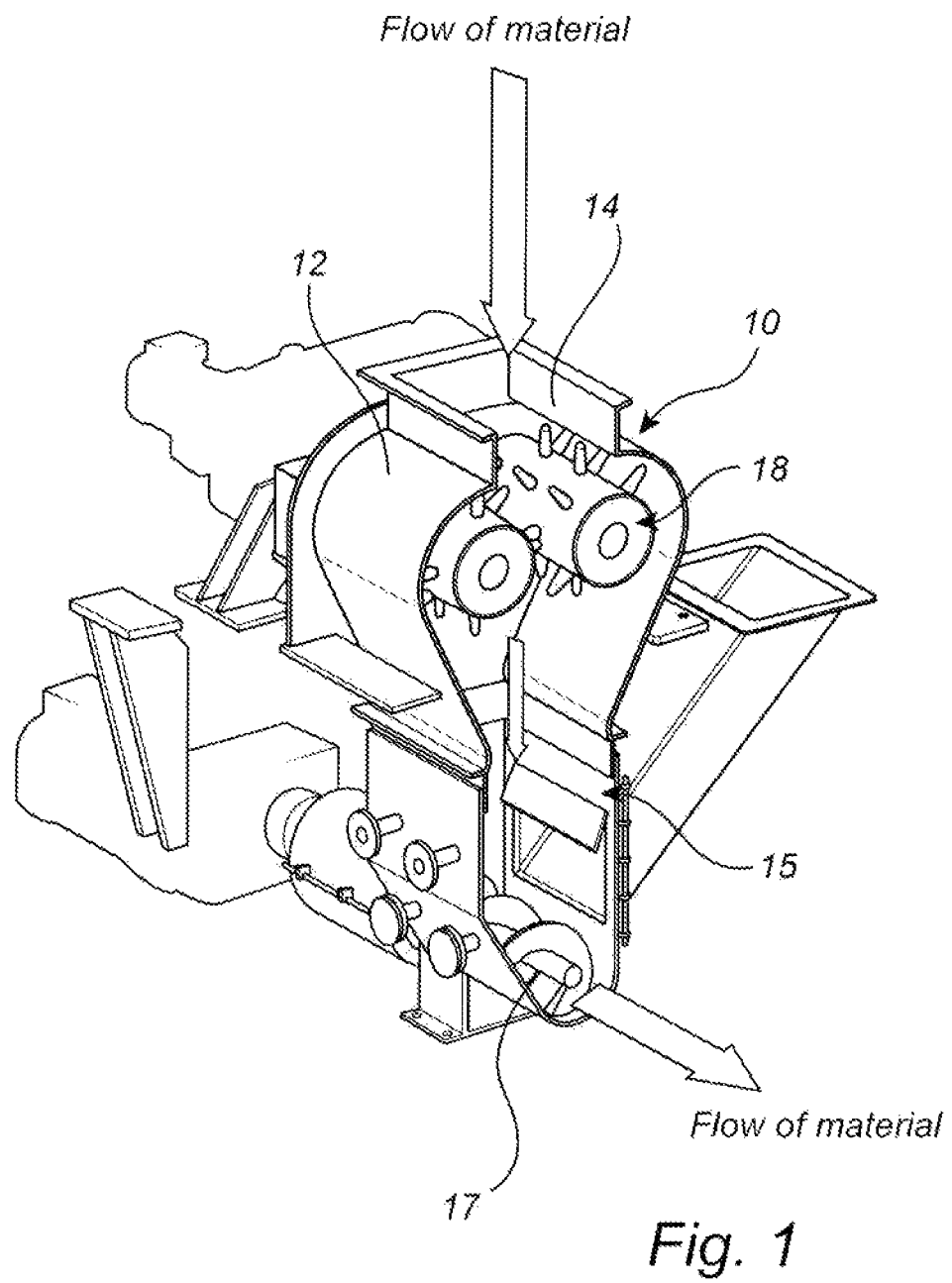
FIG. 1 is a schematic partial side view of a feeding arrangement in which the present invention can be arranged.

In the drawings, similar or corresponding elements are denoted by the same reference numbers.

For the purpose of this disclosure, the term longitudinal refers to the direction along which a body, part or element has its greatest extension. Further, when the term longitudinal is used in connection with the axes of screws, the longitudinal axis corresponds to the rotational axis of the screw.

With reference first to FIG. 1, a feeding arrangement in which the present invention can be arranged or implemented will be discussed. The pin drum feeder 10 comprises a housing 12 with an upper inlet opening 14 for receiving the material and a lower outlet opening 15 for discharging the material to the plug screw feeder 17. Revolving drums 18 are provided in the housing 12 to control the transport and flow rate of the material through the housing. After the material has passed the revolving drums, the material falls through the lower outlet opening to the plug screw feeder. The material is fed to the pin drum feeder from a vertical feeding chute or similar unit connected to the upper inlet opening of the housing 12. An effective and smooth flow of material into the pin drum feeder requires that this vertical feeding pipe is completely filled with material during operation. Hence, when the feeding pipe is completely filled with material, the flow into the pin drum feeder will be smooth and continuous. The revolving drums operate to feed the material through the housing towards the outlet opening in a controlled manner.

Figure 2:
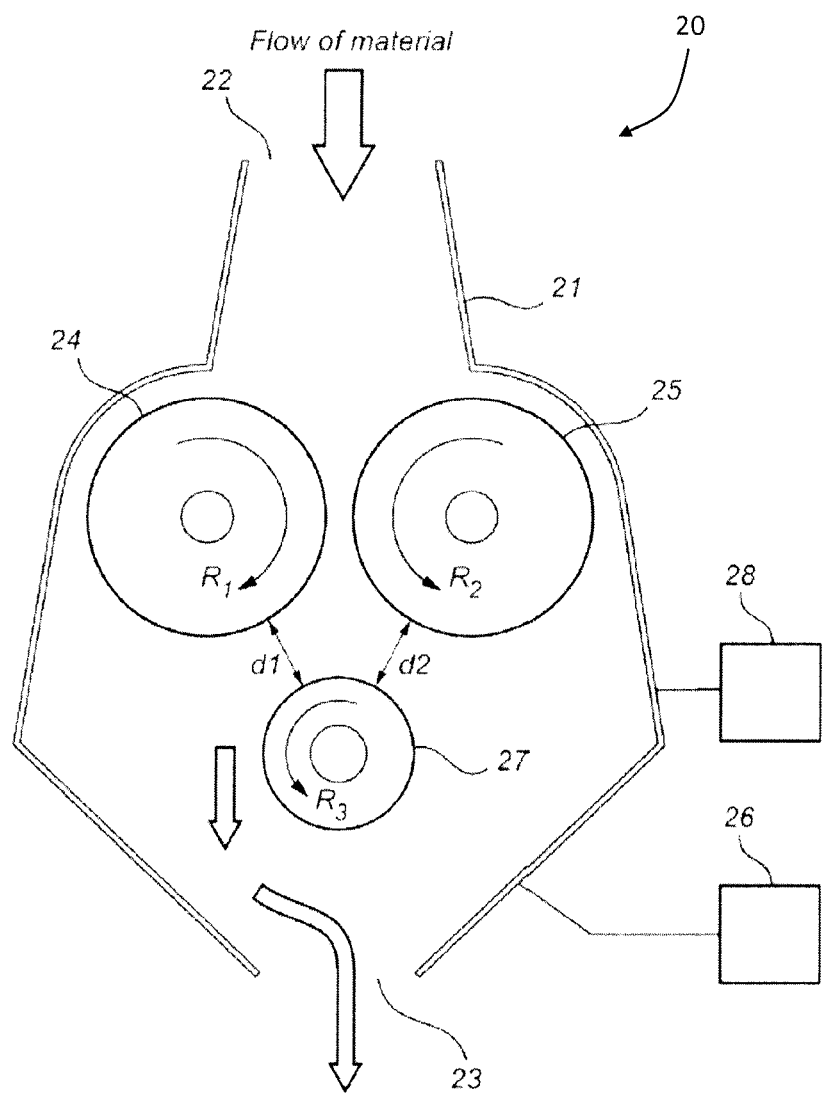
FIG. 2 is a schematic side view of an embodiment of a feeding arrangement according to the present invention.

FIG. 2 is a schematic cross-sectional side view illustrating an example feeding arrangement according to an exemplifying embodiment of the present invention. The feeding arrangement 20 for feeding lignocellulosic biomass material such as annual plant material to a treatment process, e.g. a pre-hydrolysis process, comprises a housing 21 provided with an upper inlet opening 22 for receiving the biomass material and a lower outlet opening 23 for discharging the biomass material. The biomass material is fed to the inlet opening 22 via a feeding chute (not shown) or similar construction. The feeding pipe may be vertically arranged allowing the material to fall into the feeding arrangement 20 through the inlet opening 22. Preferably, the feeding pipe is completely filled with material thereby delivering a smooth and continuous flow of material into the feeding arrangement 20.

A first and a second revolving drum 24, 25 are arranged in the housing 21. The first drum 24 is arranged to revolve or rotate in a first rotational direction $R_1$ and the second drum 25 is arranged to revolve or rotate in a second rotational direction $R_2$. The first drum 24 and the second drum 25 are arranged to co-rotate with respect to each other and thereby, by rotation of the first and second drum 24, 25, transport the biomass material through the housing 21 towards the outlet opening 23 (in FIG. 2 in a downward direction). In embodiments of the present invention, a rotational speed of the first and second revolving drum 24, 25 is controlled by a motor 26 having a variable speed. Preferably, a rotational speed of the first and second drum 24, 25 is controlled using the motor 26.

At least one tearing roll 27 is arranged at a predetermined distance d1 and d2, respectively, from the first and second revolving drum 24, 25. The tearing roll 27 is provided with tearing protrusions 70 (see FIG. 6) and is arranged with a predetermined distance to the at least one transportation device to tear off parts of the transported material to provide a substantially continuous flow rate of material.

Figure 3:
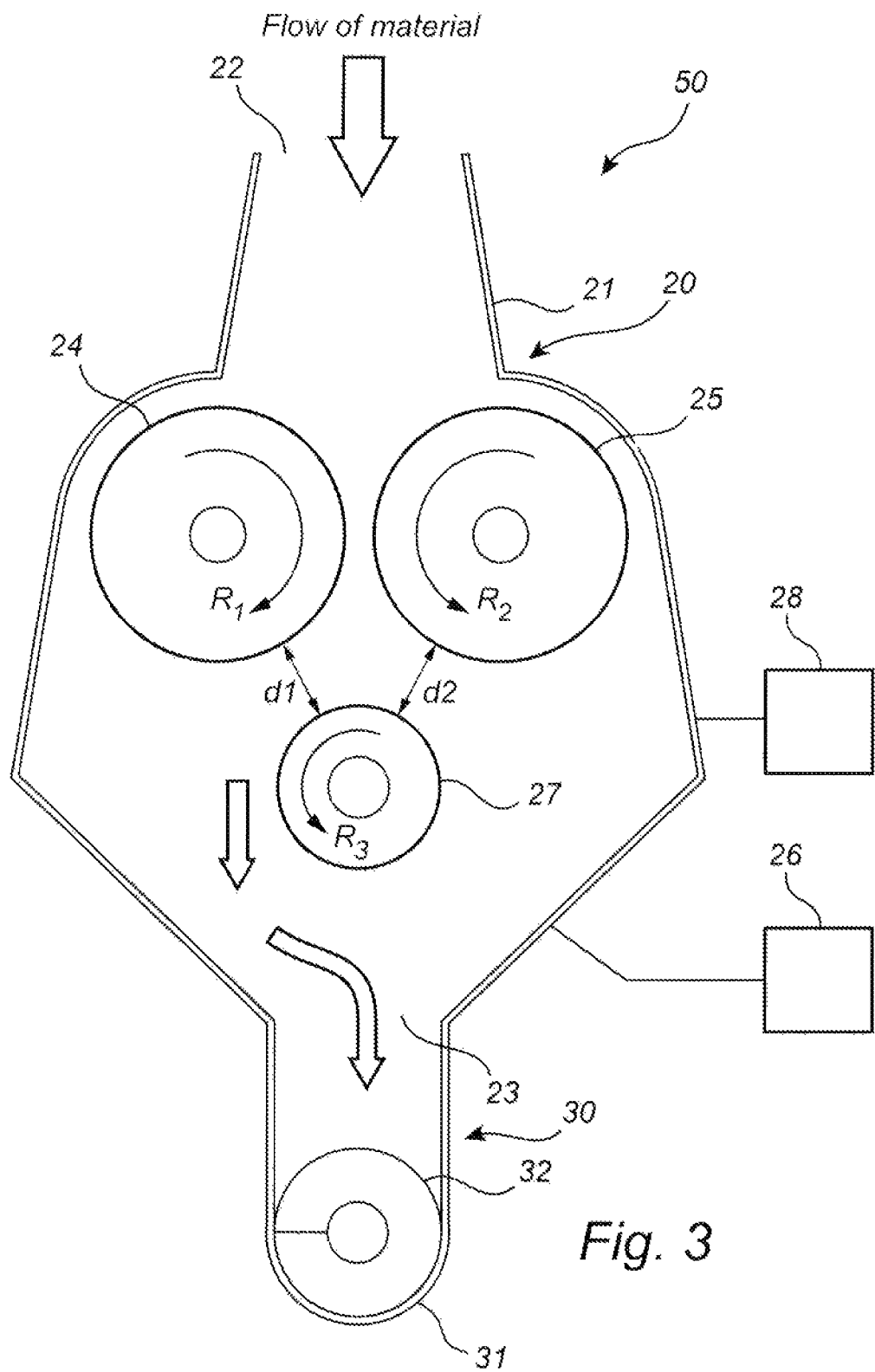
FIG. 3 is a schematic side view of an embodiment of a feeding system according to the present invention.

As can be seen in FIGS. 2 and 3, the radius of the tearing roll 27 is smaller than the radius of the first drum 24 and the radius of the second drum 25. According to embodiments of the present invention, the tearing roll 27 is arranged such that an outer part of a tearing protrusion 70 (see FIG. 6) is at a first closest predetermined distance d1 from an outer surface 74 (see FIG. 6) of the first drum 24 and at a second predetermined distance d2 from an outer surface 75 of the second drum 25. The protruding pins 66 are according to embodiments provided on the outer surfaces 74, 75.

In embodiments, the first distance d1 and second distance d2 are equal to or lower than a radius RA1 and RA2 of the first and second drum, respectively, i.e. d1, d2 RA1=RA2, and, preferably equal to or lower than half the radius RA1 and RA2 of the first and second drum, respectively, i.e. d1, d2≤0.5×RA1=RA2. Further, a minimum distance between a tip of a pin 66 and the outer part 70 of the tearing roll 27 is preferably 1 cm.

Figure 6:
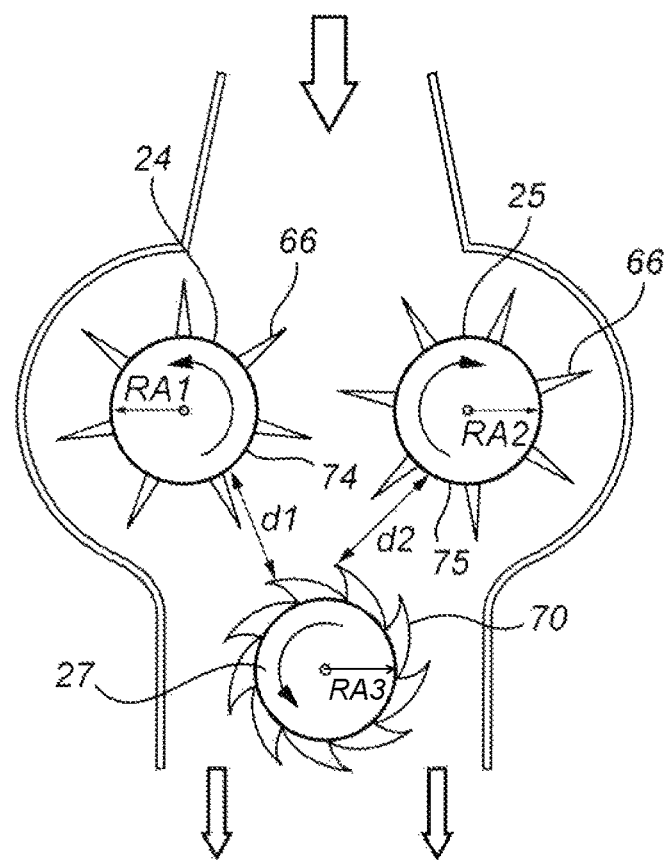
FIG. 6 is a schematic detailed view of the tearing roll and the revolving drums.

As can be seen in FIG. 6, the radius RA3 of the tearing roll 27 is smaller than the radius RA1 of the first drum 24 and the radius RA2 of the second drum 25.

As can be seen in FIG. 6, the tearing roll 27 is provided with cutting elements 70 shaped as protruding knifes. Other conceivable cutting elements are shaped as cutting discs 79 arranged on the tearing roll 77 shown in FIG. 7. A tearing roll with cutting elements is efficient for cutting, for example, annual plants. Such a tearing roll can also be operated at a higher speed.

According to embodiments of the present invention, a rotational speed of the tearing roll 27 is controlled by a motor 28 having a variable speed.

In embodiments of the present invention, the rotational speed of the tearing roll 27 can be varied independently of a rotational speed of the first and second drum 24, 25.

In embodiments of the present invention, the feeding arrangement 20 is arranged to feed material to a plug screw feeder 30 in a feeding system 50, see FIG. 3. The plug screw feeder 30 and the feeding arrangement 20 are preferably arranged perpendicular to each other, i.e. the rotational axis of the plug screw is perpendicular to a feeding direction of the feeding arrangement 20.

The plug screw feeder 30 is arranged to rotate at a variable speed, wherein the speed of the plug screw feeder operates independently of the drums 24, 25 and the tearing roll 27.

In embodiments of the present invention, the feeding arrangement 20 is a so called pin drum feeder. The drums 24, 25 are provided with protruding pins, for example cylindrical pins, for transporting the material in a controlled manner. The pin drum feeder is considered to be the "gas pedal" of the system, controlling the production capacity. The pin drum feeder ensures that an adequate amount of material is supplied to the plug screw feeder.

With reference to FIG. 3, a feeding system according to the present invention will be described. The system 50 comprises a feeding arrangement 20 as described above with reference to FIG. 2.

An outlet opening 23 of the feeding arrangement 20 is coupled to a force-feeding screw 50, in this embodiment a plug-screw feeder, to feed biomass material to the plug-screw feeder 30. The plug-screw feeder 30 transports the material to the treatment process by the rotation of the plug screw 32. The plug screw 32 is arranged in an elongated and cylindrical housing 31.

In this embodiment of the present invention, the feeding arrangement is a pin drum feeder 20. The pin drum feeder is arranged to provide a predetermined rate of material flow, i.e. the production flow, which is achieved by co-operation between the first and second drum 24, 25 and the grinding or tearing roll 27. The rotational speed of the plug screw 32 is then set in relation to the predetermined rate of material flow in order to achieve a predetermined density increase of the material in the plug screw feeder 30. If the production flow is increased, the rotational speed of the plug screw 32 has to be increased to maintain the same density in the plug screw feeder 30. If the rotational speed of the plug screw 32 is maintained while the production flow increases, the density will increase. By increasing the material density in the plug screw feeder an essentially gas- and fluid-tight plug flow of the annular material is created through the plug screw feeder 30.

As discussed above, the drums 24, 25 are provided with protruding pins 66, for example cylindrical pins, for transporting the material in a controlled manner. The pin drum feeder is considered to be the "gas pedal" of the system, controlling the production capacity. The pin drum feeder ensures that an adequate amount of material is supplied to the plug screw feeder.

According to embodiments of the present invention, a rotational speed of the tearing roll 27 is controlled by a motor 28 having a variable speed.

In embodiments of the present invention, the rotational speed of the tearing roll 27 can be varied independently of a rotational speed of the first and second drum 24, 25.

Figure 4:
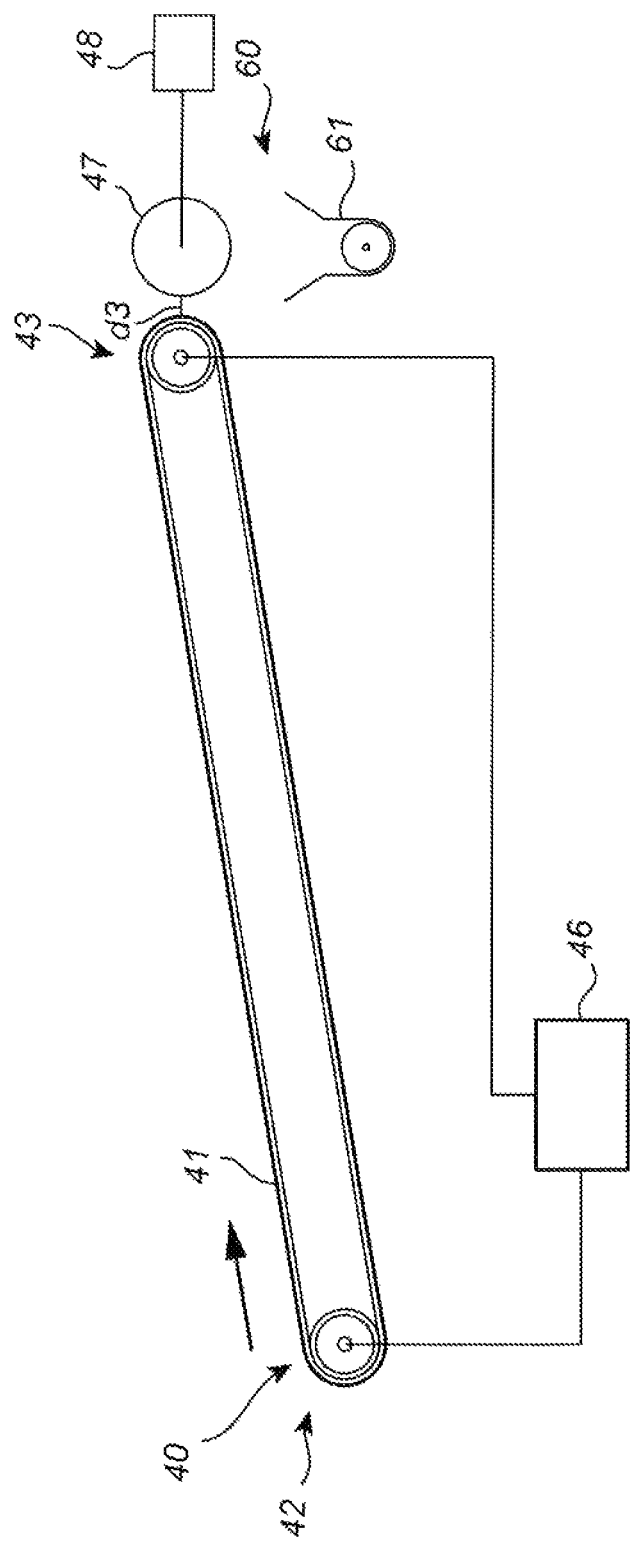
FIG. 4 is a schematic side view of another embodiment of a feeding arrangement according to the present invention.
Figure 5:
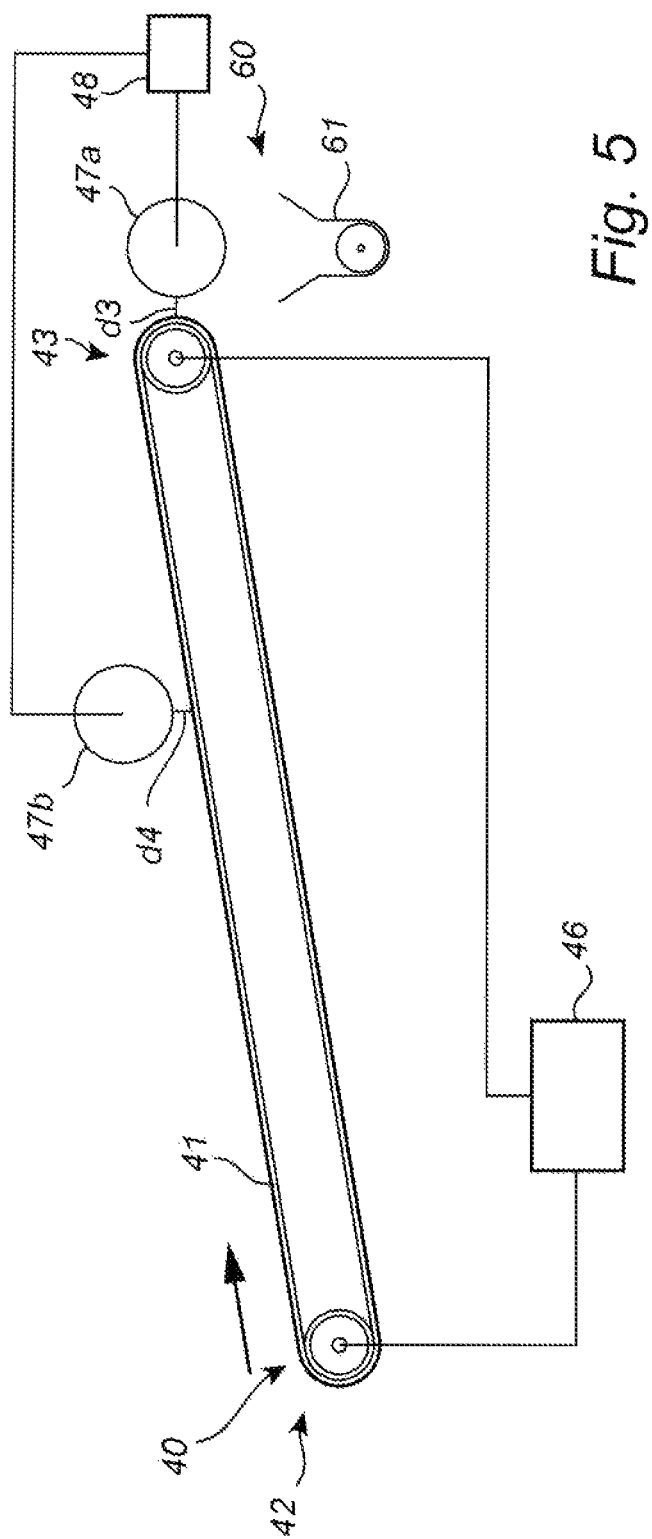
FIG. 5 is a schematic side view of a further embodiment of a feeding arrangement according to the present invention.

With reference to FIGS. 4 and 5 further embodiments of the present invention will be described. The feeding arrangement 40 for feeding biomass material to a treatment process, e.g. a pre-hydrolysis process, comprises a transportation belt or conveyer belt 41 having a receiving end 42 for receiving the biomass material and a discharge end 43 for discharging the biomass material. The conveyer belt 41 is controlled by a motor 46 having a variable speed to provide a smooth and continuous flow of material. In embodiments of the present invention, the feeding arrangement 40 is arranged to feed material to a plug screw feeder 61 in a feeding system 60 arranged downstream the conveyer belt 41, see FIGS. 4 and 5. The plug screw feeder 61 and the feeding arrangement 40 may be arranged perpendicular to each other, i.e. the rotational axis of the plug screw 61 is perpendicular to a feeding direction F of the feeding arrangement 40. The plug screw feeder 61 is arranged to rotate at a variable speed, wherein the speed of the plug screw feeder operates independently of the conveyer belt 41.

In an embodiment of the present invention illustrated in FIG. 4, a grinding or tearing roll 47 is arranged at the discharge end 43 of the conveyer belt 41 to tear off parts of biomass material being discharged from the conveyer belt 41. The tearing roll 47 is controlled by a motor 48 having a variable speed, wherein a rotation of the tearing roll 47 is variable independently of the conveying speed of the conveyer belt 41.

In embodiments of the present invention, an outer part of the tearing roll 47 is arranged at predetermined distance d3 from the discharge end 43 of the conveyer belt 41. In embodiments, the distance d3 is within a range relative the thickness or height of the layer or mat of biomass material transported on the conveyor belt 41. In embodiments, the range is between 0.5× the height of the layer (e.g. an average thickness of the layer) of the transported material and 1.5× the height of the layer (e.g. an average thickness of the layer) transported material, or at least 50 mm.

In another embodiment of the present invention illustrated in FIG. 5, a first tearing roll 47a is arranged at the discharge end 42 of the conveyer belt 41 to tear off parts of biomass material being discharged from the conveyer belt 41 to achieve a smooth stream of material. A second tearing roll 47b is arranged above a transportation side of the conveyer belt 41 to provide an even distribution of the biomass material on the conveyer belt 41.

The tearing rolls 47a and 47b are controlled by a motor 48 having a variable speed, wherein a rotation of the tearing 48 is variable independently of the conveying speed of the conveyer belt 41.

In embodiments of the present invention, the first tearing roll 47a is arranged at a first predetermined distance d3 from the discharge end 43 of the conveyer belt 41. In embodiments, the distance d3 is within a range relative the thickness or height of the layer or mat of biomass material transported on the conveyor belt 41. In embodiments, the range is between 0.5× the height of the layer (e.g. an average thickness of the layer) of the transported material–1.5× the height of the layer (e.g. an average thickness of the layer) transported material, or at least 50 mm.

The second tearing roll 47b is arranged at a second predetermined distance d4 from the conveyer belt 41 within a range relative the thickness or height of the layer or mat of biomass material transported on the conveyer belt 41. In embodiments, the range is between 0.5× the height of the layer (e.g. an average thickness of the layer) of the transported material–1.5× the height of the layer (e.g. an average thickness of the layer) transported material, or at least 50 mm.

Figure 7:
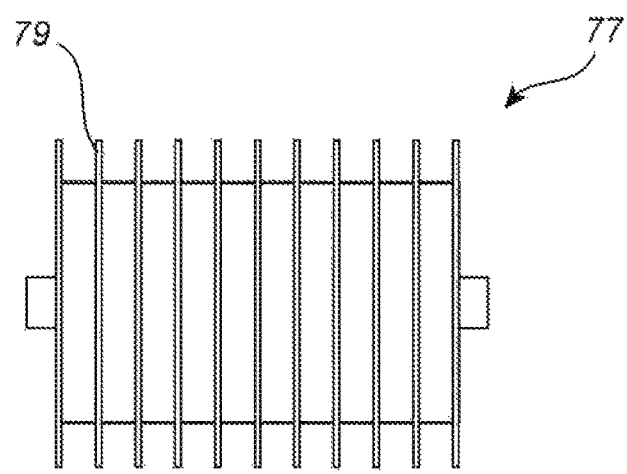
FIG. 7 is a schematic view of a further embodiment of a tearing roll in accordance with the present invention.

The tearing rolls 47a, 47b may be designed as the tearing roll illustrated in FIG. 6 and as can be seen in FIG. 6, the tearing roll 27 is provided with cutting elements shaped as protruding knifes. Other conceivable cutting elements are shaped as cutting discs 79 as shown in FIG. 7.

Figure 8A:
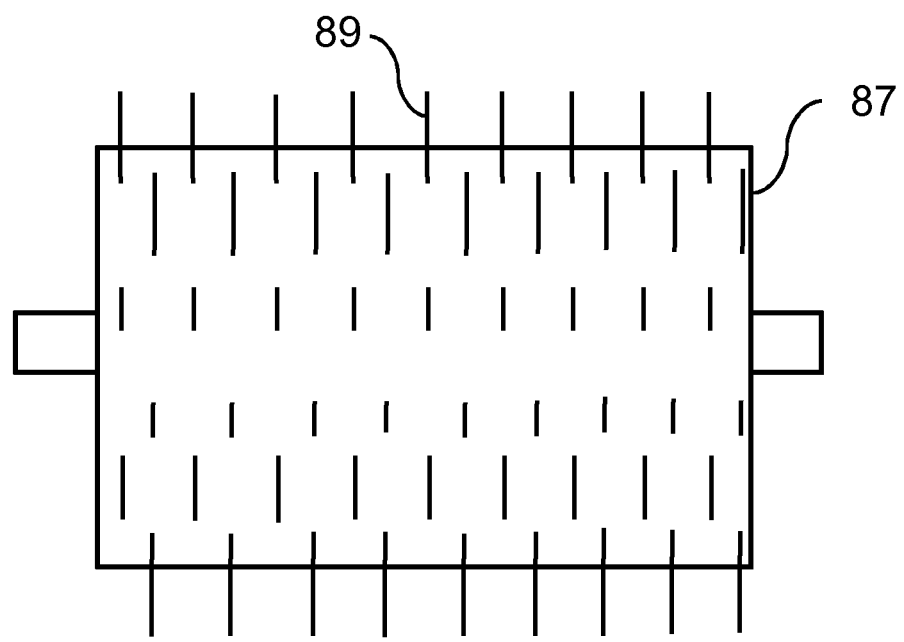
FIG. 8a is a schematic view of another embodiment of a tearing roll in accordance with the present invention.
Figure 8B:
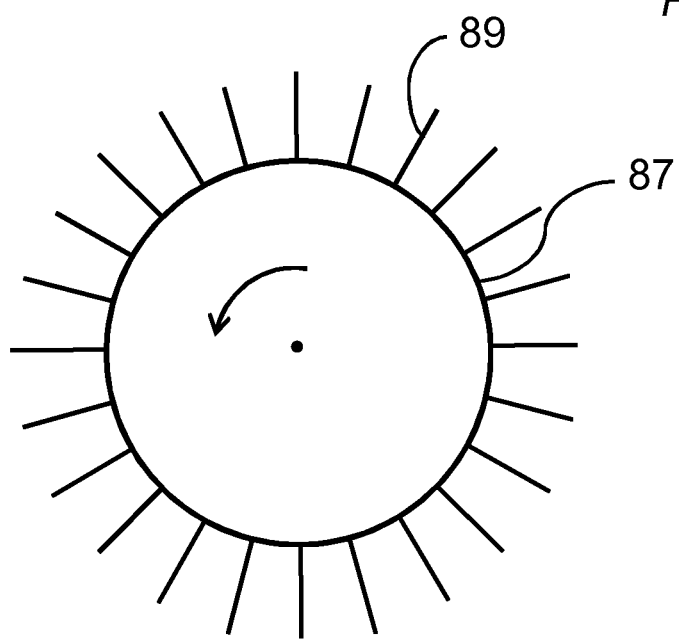

With reference to FIGS. 8a and 8b, another embodiment of a tearing roll according to the present invention will be discussed. The tearing roll 87 is provided with protruding pins or spikes 89.

The invention shall not be considered limited to the embodiments illustrated, but can be modified and altered in many ways by one skilled in the art, without departing from the scope of the appended claims.

The invention claimed is:

1. A feeding system for feeding lignocellulosic biomass material towards a hydrolysis or pre-hydrolysis process comprising:
    a feeding arrangement comprising at least one transportation device for transporting the biomass material towards the hydrolysis or pre-hydrolysis process and at least one tearing roll arranged in connection to the at least one transportation device and being provided with tearing protrusions, wherein the at least one tearing roll is arranged with a predetermined distance to the at least one transportation device to tear off parts of the transported material, said feeding arrangement further comprising a housing provided with an upper inlet opening for receiving the biomass material and a lower outlet opening for discharging the biomass material, wherein the at least one transportation device includes a first and a second revolving drum arranged in the housing, the first drum revolving in a first rotational direction and the second drum revolving in a second rotational direction for transporting the biomass material, wherein the first and second drums are provided with protrusions and wherein the first and second drums are arranged to co-rotate with respect to each other, and wherein the at least one tearing roll is arranged in the housing below the first and second drums seen in a feeding direction of the biomass material, wherein the at least one tearing roll is arranged to tear off parts of the material transported by the first and second drums in order to transport the material to the outlet opening; and
    a force-feeding screw coupled to the feeding arrangement to receive biomass material discharged from the outlet opening of the feeding arrangement, wherein the force-feeding screw is arranged to transport the biomass material towards the hydrolysis or pre-hydrolysis process.

2. The feeding system according to claim 1, wherein the force-feeding screw is a plug screw feeder arranged to transport the biomass material to the hydrolysis or pre-hydrolysis process.

3. The feeding system according to claim 2, further comprising a reactor for hydrolysis of the lignocellulosic biomass material coupled the plug screw feeder to receive the biomass material.

4. The feeding system according to claim 1, wherein a radius of the tearing roll is smaller than the radius of the first drum and the radius of the second drum.

5. The feeding system according to claim 1, further comprising a reactor for hydrolysis of the lignocellulosic biomass material coupled to the force-feeding screw to receive the biomass material.

* * * * *